Sept. 20, 1938.     G. S. HASTINGS ET AL     2,130,683
TIPPER CONSTRUCTION FOR CIGARETTE MACHINES
Filed Aug. 1, 1936
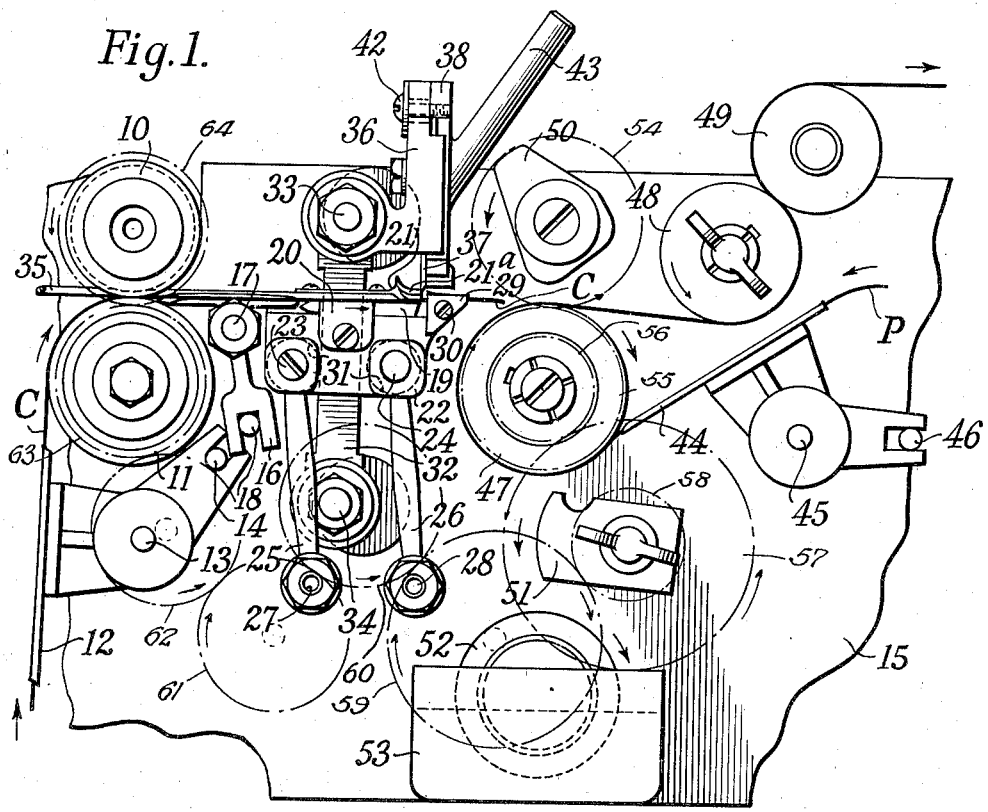
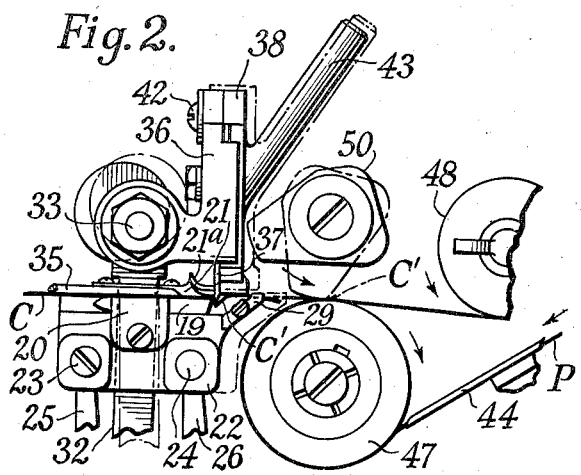
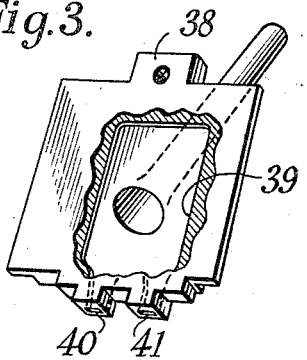
INVENTOR
George S. Hastings &
BY Charles Arelt
George S. Hastings
ATTORNEY Patented Sept. 20, 1938

2,130,683

UNITED STATES PATENT OFFICE 2,130,683

TIPPER CONSTRUCTION FOR CIGARETTE MACHINES

George S. Hastings, Brooklyn, and Charles Arelt, Richmond Hill, N. Y., assignors to American Machine & Foundry Company, a corporation of New Jersey Application August 1, 1936, Serial No. 93,826

5 Claims. (Cl. 131—39)

This invention relates to an improved tipping mechanism to be used in conjunction with continuous rod cigarette machines, its object being to produce a device suitable for operation at high speed particularly one of a type in which there is a continuous feed of the tipping material. To this end the principal object of the invention is to provide simple and effective mechanism in connection with the means for cutting the strip of tip material to hold securely the cut tip and thus to insure alignment of the severed strip with the wrapper material to which it is fed and prevent accidental displacement thereof. According to the invention a vacuum suction means is employed for this purpose.

With these and other objects in view, the invention consists in certain constructions and combinations which will be hereinafter fully described and then set forth in the appended claims.

In the accompanying drawing which forms part of this specification and in which like characters of reference indicate the same or like parts:

Fig. 1 is a front elevation of the improved cork tipper equipped with a cork feed in accordance with my invention;

Fig. 2 is a front elevation showing the cork strip when it is cut and also in an advanced position which is indicated by dot and dash lines; and Fig. 3 is a detail perspective view of the vacuum suction plate shown in Fig. 1.

The particular embodiment selected for purposes of illustration may be widely varied in construction within the scope of the claims, for the particular tipping mechanism shown is but one of many possible embodiments of the same. The invention therefore is not to be restricted to the specific construction shown and described.

Referring to the drawing, the cork tip material C, supplied from a reel, is guided into rollers 10 and 11 by a guide plate 12, adjustably mounted on the stud 13 and pin 14 supported by the housing wall 15. The rollers 10 and 11, pivotally mounted on the wall 15, are driven by suitable gearing (not shown) and carry the cork tip material C across a support 16, adjustably mounted on the housing wall 15 at 17 and 18, to a ledger plate 19, where it is to be cut. The ledger plate 19, is secured by plates 20 and 21 to its base 22 which is supported at 23 and 24 by two arms 25 and 26, pivotally mounted on the housing wall 15 at 27 and 28 respectively. A cutting guide 21ª which is formed integral with plate 21 lies over the ledger plate 19 and permits the cork tip material C to pass between when fed through to the guide 29, secured to the base 22 at 30. Rollers 31 pivoted at 23 and 24 coact with a crank arm 32, eccentrically mounted at 33 and 34 and driven by gearing (not shown) to slide up and down in the ledger plate and advance the ledger plate 19 in the direction of travel of the continuously running cork strip C. A top guide rod 35 extends horizontally over the cork strip.

The knife holder 36, to which the knife blade 37 is rigidly secured is formed integral with the crank arm 32. A vacuum suction plate 38, provided with a chamber 39 and ports 40 and 41, (see Fig. 3) is adjustably mounted on the knife holder 36 at 42. When the knife holder 36 is caused to travel to cutting position in the direction of the continuously running cork strip C the vacuum suction plate 38 is thus moved (see Fig. 2) to its effective position for holding the severed strip C' in alignment for feeding to the wrapping material P. Continuous suction is supplied from its source to the vacuum plate 38 at 43 and effectively holds the strip C' against displacement at points opposite the ports 40 and 41.

The paper wrapping material P is continuously fed from a reel (not shown) over a guide plate 44 adjustably mounted on the stud 45 and pin 46 and is supported by the housing wall 15. From the guide plate 44, rollers 47 and 48, pivotally mounted on wall 15 and driven by suitable gearing (not shown) carry the wrapping material P to an idler roller 49. A rotating arm 50, pivoted to the wall 15, is also driven by gearing (not shown) which feeds the wrapping material P at a greater rate of speed than the cork strip material C.

While the severed cork strip C' is being held in alignment the leading edge of the rotating arm 50 grips it, just a little back of its forward edge to provide against any difference in the lengths of the strips C' which might occur and to prevent paste from smudging the arm 50.

The paper wrapping material P in passing around the roller 47 has paste applied to it at regular intervals by a pasting arm 51 which contacts a paste drum 52 revolving in a paste pot 53 mounted on the housing wall 15. The pasting arm 51 and paste drum 52 are both driven by gearing (not shown).

It is noted that continuous suction employed eliminates any valve installation, thus simplifying construction, lowering cost, and eliminating moving parts. The latter reduces vibration which would tend to limit the speed possible.

But even more important is the elimination of the need for any valving of suction to release the tip, which obviously, at say 700 to 1,200 cycles a minute would involve special difficulties, especially in the releasing of suction at such speeds.

In the operation of the improved tipper, the web of tipping material is fed continuously by the rollers 10 and 11 at a maximum speed substantially less than that of the paper P and across the support 16 on to the ledger plate 19 whereon the cork strips are severed by the knife 37. The knife holder 36 descends with the knife and severs the tipping material when it reaches its lowermost position where its horizontal speed equals that of the tip material, and the suction plate descends therewith to suctionally grip the severed strip immediately after severance. The continued orbital movement of the knife holder moves the suction plate with its adhering strip into position to be nipped by the arm 50 and pressed against the pasted section of the paper then moving over roll 47, whereby the tip is stripped off the suction plate, each tip, as cut, being fed by the arm 50 at paper speed in contact with the paper web.

Upon reference to Fig. 1, it will be seen that the rotating members 47 and 50 are connected by gears of equal diameter, 54 and 55, indicated in dot-dash lines, so that the member 50 rotates at paper speed; also that by means of gears 56, 57, 58, 59 and 60, the ledger 19 and knife holder 36 have a certain horizontal speed less than that of the paper speed, and which conforms to the feeding speed of the tip material, by reason of the chain of carrier gears 61 and 62, the latter meshing with gear 63 on the shaft of feed roll 11, which is enmeshed with gear 64 that actuates the feed roll 10 for the tip material.

What is claimed is:

1. A cigarette tipper comprising in combination, a tip material feed arranged to feed tip material continuously, a cigarette paper feed arranged to feed cigarette paper continuously at a greater speed than that of the tip material, a cutter for cutting tip lengths from the continuously fed tip material, mechanism for gripping the cut tips and feeding them at paper speed in contact with said paper, a moving tip transporter carrying the tip from cutting position into the range of action of said mechanism, and suction means traveling with said transporter for holding the tip thereon, said transporter including a reciprocating table movable to and from a position delivering the tip into the range of action of said mechanism, and means giving said suction means simultaneous movement having a component in the direction of movement of said transporter and a component transverse to said transporter to bring the suction means into contact with the tip thereon during movement of the transporter.

2. A cigarette tipper comprising in combination a tip material feed arranged to feed a web of tip material continuously, a cigarette paper feed, a feed table movable between a position to receive the forward end of the web of tip material and carry the same into position to be applied to the cigarette paper, a cutter, means giving said cutter movement in the direction of table movement and at the same time cutting movement transverse thereto, and a suction head secured to said cutter for movement therewith into position to act on the tip material to hold the same on said table.

3. A cigarette tipper comprising in combination a tip material feed arranged to feed a web of tip material continuously, a cigarette paper feed arranged to feed cigarette paper continuously at a greater speed than that of the tip material, a feed table reciprocable from a position to receive the forward end of said web of tip material to a position at which the tip is applied to the cigarette paper, a cutter for cutting lengths from the web on said table, and a suction head traveling with said table for holding the tip material against misalignment relative to said table, tip applying mechanism for gripping the cut tip on said table and applying the same against said paper, said suction head having a conduit for connecting same to a continuous source of supply of suction whereby suction is continuous at the head, said applying mechanism operating to strip the cut tip from said suction head.

4. A cigarette tipper comprising in combination a tip material feed arranged to feed a web of tip material, a cigarette paper feed, a reciprocable feed table movable between said tip material and said paper feed, a suction head for holding the tip material on said table against misalignment relative thereto, a drive crank and connections between said drive crank and said table and head imparting substantially rectilinear reciprocating movement to said table, and a combined rectilinear movement substantially equal to that of the table and a simultaneous movement transverse to the table to bring said head toward and away from the table while following the rectilinear movement thereof.

5. In a machine for applying covering material to separated portions of a continuous strip material, the combination with means for continuously feeding the strip material, a device for applying adhesive at spaced intervals to said strip, means for cutting the covering material including a reciprocating ledger plate and a knife cooperating therewith for cutting lengths of the material to be applied to the adhesive portions of the strip material, means for applying the severed strips of the material to adhesive portions of the strip material, of continuous suction means for retaining the severed lengths of the material in alignment prior to being applied to the adhesive portions of the strip material.

GEORGE S. HASTINGS.
CHARLES ARELT.